(12) United States Patent
Slocum et al.

(10) Patent No.: US 12,503,260 B1
(45) Date of Patent: Dec. 23, 2025

(54) PACKAGING WATER-REACTIVE ALUMINUM

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 382 days.

(21) Appl. No.: 18/332,531

(22) Filed: Jun. 9, 2023

Related U.S. Application Data

(62) Division of application No. 17/487,865, filed on Sep. 28, 2021, now Pat. No. 11,767,137, which is a
(Continued)

(51) Int. Cl.
| | |
|---|---|
| *B65D 81/18* | (2006.01) |
| *B65B 1/04* | (2006.01) |
| *B65B 3/04* | (2006.01) |
| *B65B 5/04* | (2006.01) |
| *B65B 5/06* | (2006.01) |
| *B65B 25/00* | (2006.01) |
| *B65B 31/04* | (2006.01) |
| *B65B 35/12* | (2006.01) |
| *B65B 63/00* | (2006.01) |
| *B65B 63/04* | (2006.01) |
| *B65B 63/08* | (2006.01) |

(Continued)

(52) U.S. Cl.
CPC ............... *B65B 25/00* (2013.01); *B65B 1/04* (2013.01); *B65B 3/04* (2013.01); *B65B 5/04* (2013.01); *B65B 5/06* (2013.01); *B65B 31/041* (2013.01); *B65B 35/12* (2013.01); *B65B 63/00* (2013.01); *B65B 63/04* (2013.01); *B65B 63/08* (2013.01); *B65D 81/18* (2013.01); *B65D 85/70* (2013.01); *C01B 3/08* (2013.01); *F27D 3/00* (2013.01); *B65B 2220/14* (2013.01); *F27D 2003/0042* (2013.01)

(58) Field of Classification Search
CPC .......... B65D 81/18; B65D 85/70; F27D 3/00; F27D 2003/0042; F27D 2003/0045; C21D 9/563; F26B 13/14; F26B 13/18; A23L 3/001; A23L 3/005; A23L 3/08; A23L 3/02; A23L 3/022
See application file for complete search history.

(56) References Cited

U.S. PATENT DOCUMENTS

2020/0346795 A1 * 11/2020 Fontanazzi ......... B29C 66/4312

\* cited by examiner

*Primary Examiner* — Gregory A Wilson
(74) *Attorney, Agent, or Firm* — The Marbury Law Group, PLLC

(57) ABSTRACT

A method of packaging water-reactive aluminum may include directing at least one discrete object into a container, the at least one discrete object including an aluminum alloy, the aluminum alloy plastically deformed and non-recrystallized, introducing, into the container, a liquid metal alloy including one or more activation metals, enclosing the at least one discrete object and the liquid metal alloy with one another in the container to form a kit, for a predetermined period, exposing the kit to a heating environment, and agitating the at least one discrete object and the liquid metal alloy in the container in the heating environment during the predetermined period to form the kit into a packaged unit of water-reactive aluminum.

10 Claims, 6 Drawing Sheets

Related U.S. Application Data division of application No. 17/315,163, filed on May 7, 2021, now Pat. No. 11,148,840.

(60) Provisional application No. 63/063,410, filed on Aug. 9, 2020, provisional application No. 63/021,152, filed on May 7, 2020.

(51) Int. Cl.
*B65D 85/00* (2006.01)
*C01B 3/08* (2006.01)
*F27D 3/00* (2006.01)

PACKAGING WATER-REACTIVE ALUMINUM

CROSS-REFERENCE TO RELATED APPLICATIONS

This application is a divisional application of U.S. patent application Ser. No. 17/487,865, filed Sep. 28, 2021, which is a divisional application of U.S. patent application Ser. No. 17/315,163, filed May 7, 2021 (now U.S. Pat. No. 11,148, 840), which claims priority to U.S. Provisional Patent Application 63/021,152, filed May 7, 2020, and to U.S. Provisional Patent Application 63/063,410, filed Aug. 9, 2020, with the entire contents of each of these applications hereby incorporated herein by reference.

BACKGROUND

Under normal environmental conditions, aluminum is covered with a protective oxide coating. This oxide coating forms rapidly in air and is stable. Thus, although aluminum itself can be reactive with water to produce hydrogen and heat, the oxide coating on aluminum is an obstacle to using aluminum as a source of energy.

To overcome the impact of aluminum oxide on the water-reactivity of aluminum, aluminum can be treated to be in an activated form that yields a large amount of hydrogen and heat when reacted with water. With this combination of energy density and water-reactivity, activated aluminum is a volumetrically efficient and useful source of hydrogen. However, materials used to form activated aluminum can be expensive. Further, given that it is subject to fouling by oxygen, water vapor, or other contaminants, activated aluminum can be challenging to handle and transport. Thus, collectively or individually, these issues can impact the cost-effectiveness and feasibility of using activated aluminum as a source of hydrogen for certain applications.

SUMMARY

According to one aspect, a method of packaging water-reactive aluminum may include directing at least one discrete object into a container, the at least one discrete object including an aluminum alloy, the aluminum alloy plastically deformed and non-recrystallized, introducing, into the container, a liquid metal alloy including one or more activation metals, enclosing the at least one discrete object and the liquid metal alloy with one another in the container to form a kit, for a predetermined period, exposing the kit to a heating environment, and agitating the at least one discrete object and the liquid metal alloy in the container in the heating environment during the predetermined period to form the kit into a packaged unit of water-reactive aluminum.

In some implementations, directing the at least one discrete object into the container may include unspooling a portion of an aluminum-containing wire and plastically deforming the portion of the aluminum-containing wire to form the at least one discrete object. Plastically deforming the portion of the aluminum-containing wire may include, for example, wrapping the portion of the aluminum-containing wire about a mandrel to form the at least one discrete object in a coil shape. Further, or instead, plastically deforming the portion of the aluminum-containing wire may include cutting the portion of the aluminum-containing wire to form the at least one discrete object.

In certain implementations, introducing the liquid metal alloy into the container may include moving the liquid metal alloy into the container contemporaneously with directing the at least one discrete object is directed into the container.

In some implementations, in the kit, the liquid metal alloy in the container may be greater than about 1 percent and less than about 5 percent, by weight, of the aluminum alloy of the at least one discrete object.

In certain implementations, enclosing the at least one discrete object and the liquid metal alloy with one another in the container includes securing a lid to the container.

In certain implementations, agitating the at least one discrete object and the liquid metal alloy in the container in the heating environment may include repeatedly moving the container relative to at least one axis defined by the container. For example, agitating the at least one discrete object and the liquid metal alloy in the container may include rotating the container about a longitudinal axis defined by the container. As a further example, rotating the container about the longitudinal axis defined by the container may include supporting the container on a pair of rollers, and rotating the pair of rollers relative to one another and relative to an outer circumference of the container. In some instances, at least one roller of the pair of rollers is heated with the container supported thereon. Further, or instead, the heating environment may include a volume defined by a tunnel oven, and rotating the pair of rollers relative to one another and relative to the outer circumference of the container moves the kit through the tunnel oven in a cycle time based on the predetermined period. Additionally, or alternatively, at least one of the pair of rollers may include a coating including one or more of an adhesive or a polymer in contact with the outer circumference of the container during at least a portion of a full rotation of the container about the longitudinal axis.

According to another aspect, a system for forming packaged units of water-reactive aluminum may include an oven defining a volume, a set of tracks defining a path through the volume, and a carriage including a linkage and a pair of rollers, the pair of rollers coupled to one another via the linkage, the pair of rollers positionable along the set of tracks with an outer circumference of a container supported on the pair of rollers away from the set of tracks, and the pair of rollers rotatable to move the carriage along the set of tracks while rotating the outer circumference of the container supported on the pair of rollers away from the set of tracks.

In some implementations, each track may include a sinusoidal section out of phase with a respective sinusoidal section of the other one of the set of tracks, and the pair of rollers are movable over respective sinusoidal sections of the set of tracks to rotate the container about two perpendicular axes as the carriage moves along the path.

In certain implementations, the system may further include an actuator and a controller. For example, the actuator may be in electrical communication with the controller, the actuator is actuatable to move the carriage along the set of tracks, and the controller configured to send a signal to the actuator, the signal to the actuator corresponding to movement of the carriage along the path at a time-average rotational speed of the pair of rollers corresponding to a predetermined period of the carriage within the volume. Additionally, or alternatively, the actuator may be actuatable to rotate at least one roller of the pair of rollers. Further, or instead, the signal from the controller to the actuator may correspond to instantaneous rotational speed of the pair of rollers greater than zero at any time during the predetermined period of the carriage within the volume.

According to yet another aspect, a kit treatable to form a packaged unit of water-reactive aluminum may include a container including a lining defining at least a portion of a reservoir sealed from an environment outside of the container, and at least one discrete object disposed in the reservoir, the at least one discrete object including an aluminum alloy and one or more activation metals, each of the aluminum alloy and the one or more activation metals plastically deformed and non-recrystallized in the at least one discrete object, the at least one discrete object inert with respect to the lining of the container.

In some implementations, an environment in the reservoir containing the at least one discrete object includes one or more gases that are substantially inert with respect to the aluminum alloy and the one or more activation metals, and the one or more gases are denser than air at room temperature and at atmospheric pressure at sea-level.

BRIEF DESCRIPTION OF THE FIGURES

Like reference symbols in the various drawings indicate like elements.

DETAILED DESCRIPTION

Figure 1A:
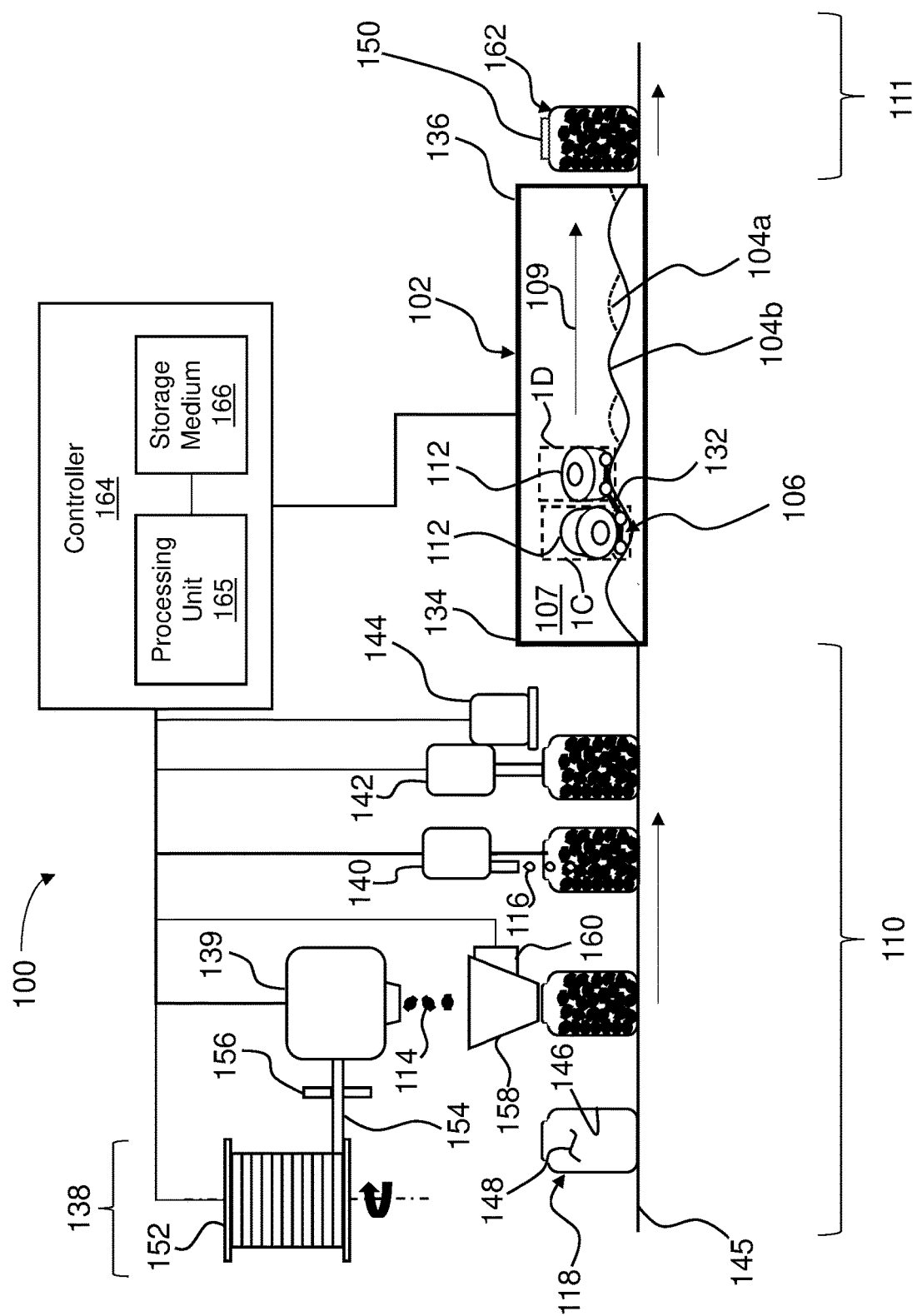
FIG. 1A is a schematic representation of a system for forming packaged units of water-reactive aluminum.
Figure 1B:
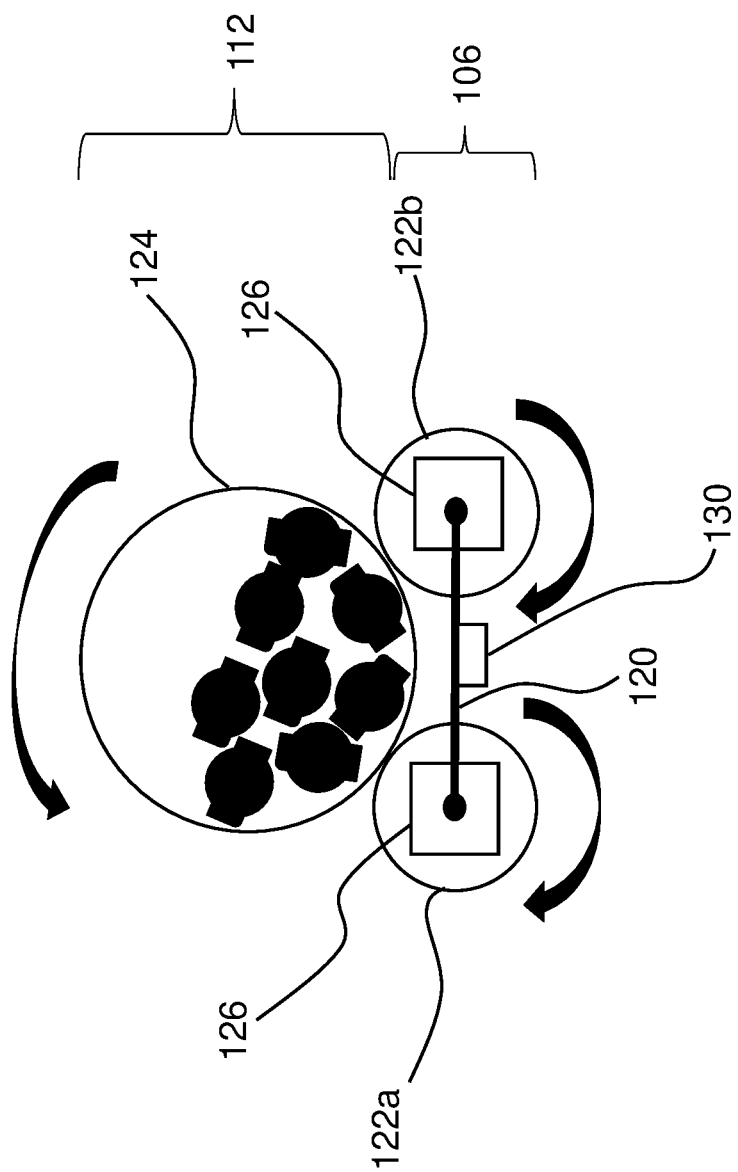
FIG. 1B is a schematic representation of rotation of a pair of rollers moving a kit along a set of tracks in an oven of the system of FIG. 1A while also rotating a container of the kit supported on the pair of rollers.
Figure 1C:
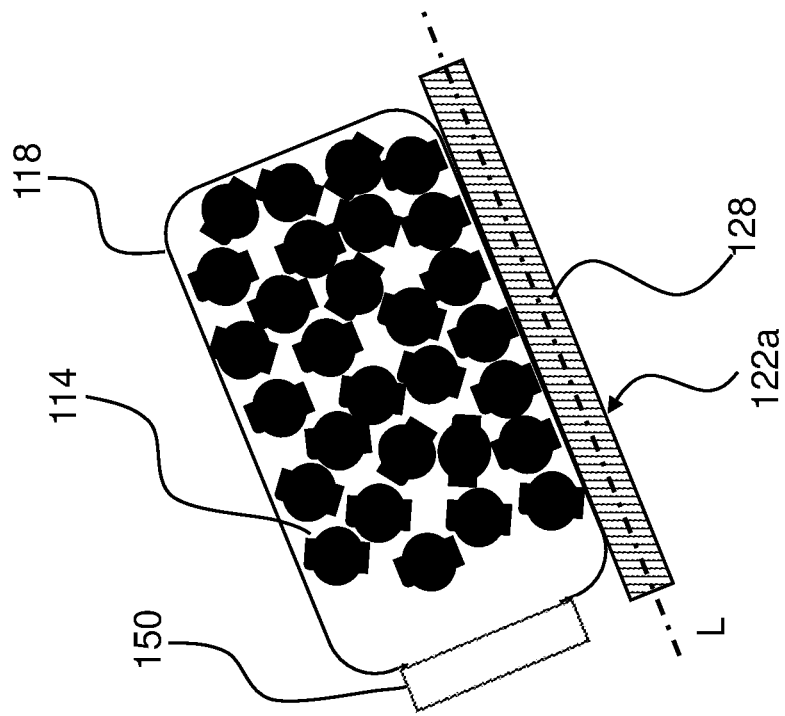
FIG. 1C is a schematic representation of a kit moving along the set of tracks in the oven of FIG. 1A along the area of detail 1C in FIG. 1A.
Figure 1D:
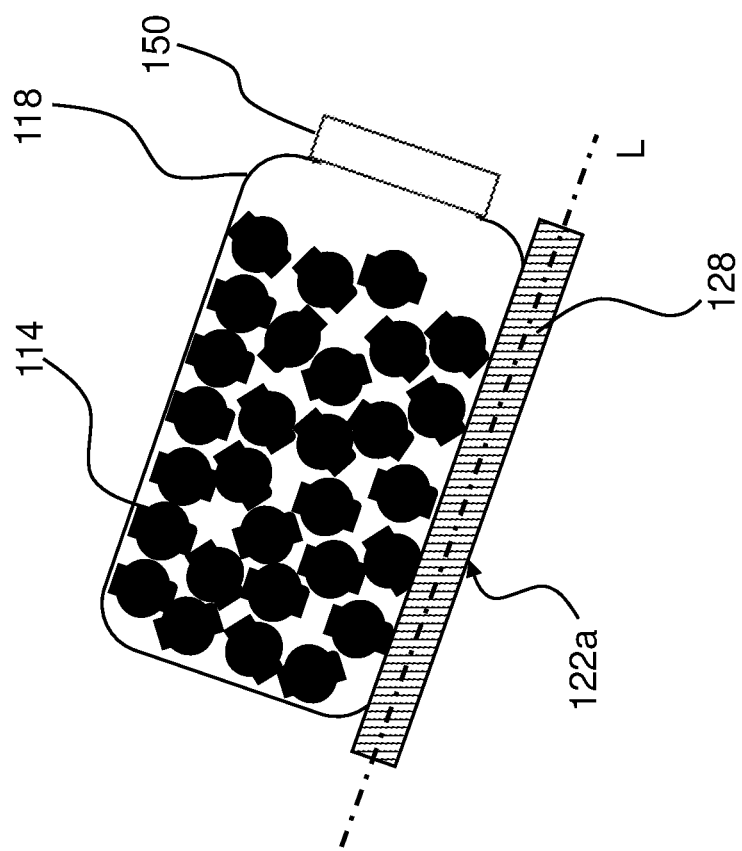
FIG. 1D is a schematic representation of a kit moving along the set of tracks in the oven of FIG. 1A along the area of detail 1D in FIG. 1A.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or." and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to elaborate upon the embodiments and does not pose a limitation on the scope of those embodiments. No language in the specification should be construed as indicating any unclaimed element as essential to the practice of the disclosed embodiments.

Using activated aluminum as a source of hydrogen and heat can present challenges with respect to the cost and robustness of the supply chain used to produce the activated aluminum and deliver it with little or no spoilage to an end-use location. Accordingly, in the description that follows, various aspects of packaging materials for activated aluminum formation are described. For example, certain systems and methods described herein relate to combining aspects of manufacturing and packaging to form packaged units of activated aluminum that are cost-effective to produce (e.g., making efficient use of raw material) while being stable and robust throughout a wide range of conditions that may be encountered in a supply chain used to deliver activated aluminum to an end-use location. Additionally, or alternatively, some systems and methods described herein relate to producing kits that are activatable, for example by an end-user, to produce water-reactive aluminum on-demand in the field. Because these kits may be activated to produce water-reactive aluminum at or near a location and time at which hydrogen is needed, such kits may be well-suited for transport to remote field locations with little or no need for specialized equipment and/or training of personnel.

As used herein, the terms "activated aluminum," "aluminum in an activated form." "water-reactive aluminum," and "water-reactive material" shall be understood to be interchangeable with one another, unless otherwise specified or made clear from the context, with the different terms being used to facilitate readability in different contexts. Further, unless a contrary intent is indicated, each of these terms shall be understood to include any manner and form of aluminum that may produce hydrogen upon exposure to water, with or without the addition of additional materials. Some examples of activated aluminum useable herein are set forth in U.S. Pat. No. 10,745,789, issued to Jonathan Thurston Slocum on Aug. 18, 2020, and entitled "Activated Aluminum Fuel," the entire contents of which are hereby incorporated herein.

Referring now to FIGS. 1A-1D, a system 100 may include an oven 102, a set of tracks 104a,b (collectively referred to herein as the set of tracks 104a,b, and individually referred to herein as a first track 104a and a second track 104b), and a carriage 106. The oven 102 may define a volume 107, and the set of tracks 104a,b may define a path 109 through the volume 107. As compared to casting, the oven 102 may facilitate achieving higher throughput production of high-quality activated aluminum at lower costs and, in doing so, may promote production of activated aluminum in industrial-scale quantities. The system 100 may additionally include a pre-processing station 110 and/or a post-processing station 111. For example, as described in greater detail below, the pre-processing station 110 may generally provide a supply of input material to the oven 102, and the post-processing station 111 may receive output from the oven 102 to carry out certain finishing steps useful for promoting quality of the finished product. For the sake of clear and efficient description, the oven 102, the pre-processing station 110, and the post-processing station 111 are described as being co-located with one another such that the system 100 may operate produce activated aluminum in a continuous end-to-end process. It shall be appreciated, however, that such co-location is not necessarily required for operation of the system 100. That is, unless otherwise specified or made clear from the context, it shall be understood that one or both of the pre-processing station 110 or the post-processing station 111 may be located away from the oven 102, such as may be useful for addressing constraints related to safety, available footprint, material handling, and the like.

In use, as described in greater detail below, a kit 112 may be formed in the pre-processing station 110, and the carriage 106 may move the kit 112 along the path 109, through the volume 107 of the oven 102. It shall be appreciated that this may be done continuously or semi-continuously (e.g., with pauses as necessary or desirable) for any number of instances of the kit 112. The kit 112 may include at least one discrete object 114 and a liquid metal alloy 116 sealed in a container 118. The at least one discrete object 114 may include an aluminum alloy, and the liquid metal alloy 116 may include one or more activation metals. As the carriage 106 moves the kit 112 through the volume 107 of the oven 102 at elevated temperature, the movement of the carriage 106 may also agitate the at least one discrete object 114 and the liquid metal alloy 116 in the container 118 of the kit 112 to promote mixing the at least one discrete object 114 and the liquid metal alloy 116 with one another. This provides certain advantages of a closed system while facilitating cost-effective production at high throughput. For example, as also described in greater detail below, this combination of heating and agitation in the container 118 may facilitate forming activated aluminum using only a small amount of activation metal which, in turn, offers significant cost benefits compared to forming activation metal through casting or other production techniques requiring larger amounts of activation metal. Additionally, or alternatively, the combined heating and agitation resulting from movement of the carriage 106 through the volume 107 of the oven 102 at elevated temperature may form activated aluminum in situ in the packaging—namely, in the container 116—that may be used to ship and/or store the activated aluminum. This may result in a nearly closed system with respect to handling one or more activation metals, thus limiting the potential for unintended spread of the one or more activation metals across machine components that may be prone to damage (e.g., liquid metal embrittlement) when exposed to the one or more activation metals. Further, as compared to casting or other techniques for forming activated aluminum, the in-situ formation of activated aluminum in the container 118 at least partially sealed from the environment may facilitate more cost-effective production of activated aluminum through lower oxidation losses of the one or more activation metals.

In general, the carriage 106 may include a linkage 120 and a pair of rollers 122a,b (collectively referred to as the pair of rollers 122a,b and individually referred to as the first roller 122a and the second roller 122b). The first roller 122a and the second roller 122b may be coupled to one another via the linkage 120. For example, the first roller 122a and the second roller 122b may each extend beyond either side of the linkage 120 such that the pair of rollers 122a,b may be positionable along the set of tracks 104a,b with an outer circumference 124 of the container 118 supported on the pair of rollers 122a,b away from the set of tracks 104a,b. With the outer circumference 124 of the container 118 so supported on the pair of rollers 122a,b and the pair of rollers 122a,b positioned along the set of tracks 104a,b, the rotation of the pair of rollers 122a,b may move the carriage 106 along the set of tracks 104a,b while rotating (in an opposite rotational direction to the direction of rotation of the pair of rollers 122a,b) the outer circumference 124 of the container 118 supported on the pair of rollers 122a,b away from the set of tracks 104a,b. Stated differently, the pair of rollers 122a,b may couple movement of the carriage 106 through the heating environment, in the volume 107 of the oven 102, with agitation of the container 118. In doing so, the pair of rollers 122a,b may advantageously promote large-scale mixing of the at least one discrete object 114 and the liquid metal alloy 116 in the container 118 (e.g., by tumbling within the container 118) while also promoting mixing on a smaller scale-namely, penetration of the one or more activation metals of the liquid metal alloy 116 along grain boundaries of the aluminum alloy of the at least one discrete object 114. Under appropriate conditions, such as those described in greater detail below, such a combination of macroscopic and microscopic material interactions may facilitate achieving significant penetration of the liquid metal alloy 116 throughout the grain structure of the aluminum alloy of the at least one discrete object 114 such that the aluminum alloy may become high-quality activated aluminum within the container 118 using only a small amount of the liquid metal alloy 116.

The first roller 122a and the second roller 122b may each extend across the set of tracks 104a,b such that at least a portion of each one of the pair of rollers 122a,b is between the first track 104a and the second track 104b. The container 118 may be at least partially supported by the first roller 122a and the second roller 122b between the set of tracks 104a,b, and the weight of the carriage 106 and the container 118 is distributed across the set of tracks 104a,b. For example, the first roller 122a and the second roller 122b may each be approximately cylindrical (e.g., with allowances for manufacturing tolerances) at least along the respective portion of each one of the pair of rollers 122a,b between the set of tracks 104a,b. In such implementations, the respective longitudinal dimensions of the first roller 122a and the second roller 122b may each be substantially parallel to one another, with deviations from exact parallelism being acceptable to the extent such deviations permit movement of the pair of rollers 122a,b along the set of tracks 104a,b while supporting and rotating the outer circumference 124 of the container 118 therebetween. For example, the container 118 may be substantially cylindrical (e.g., with allowances for manufacturing tolerances and features associated with securement of a lid or other hardware) such that the container 118 defines a longitudinal axis "L", and the container 118 may be supported by the pair of rollers 122a,b with the longitudinal axis "L" of the container 118 generally aligned (allowing for small deviations associated with manufacturing tolerances) with the respective longitudinal dimensions of the pair of rollers 122a,b. Continuing with this example, agitating the at least one discrete object 114 and the liquid metal alloy 116 in the container 118 may include rotating the container about the longitudinal axis "L." That is, with the container 118 supported on the pair of rollers 122a,b, rotation of the pair of rollers 122a,b relative to one another and relative to the outer circumference 124 of the containing 118 may rotate the container 118 about the longitudinal axis "L."

In certain implementations, one or both of the first roller 122a or the second roller 122b may include a heater 126 such that the portion of the first roller 122a or the second roller 122b, as the case may be, in contact with the outer circumference 124 of the container 118 may be heated to a temperature greater than an average temperature in the volume 107 of the oven 102. Such localized heating at the first roller 122a and/or the second roller 122b may be useful for exposing the contents of the container 118 to a precise temperature profile as the container 118 is supported on the pair of rollers 122a,b. Further, or instead, localized heating through the first roller 122a and/or the second roller 122b may facilitate efficient use of energy to heat the contents of the container 118. Further or instead, one or both of the first roller 122a or the second roller 122b may be formed of one or more thermally conductive materials (e.g., one or more metals), as may be useful for promoting convective heat transfer from the first roller 122a and/or the second roller 122b to the container 118, ultimately promoting heating of the contents of the container 118.

In some implementations, one or both of the first roller 122a or the second roller 122b may include a coating 128 to reduce the likelihood of slipping between the container 118 and the pair of rollers 122a,b as the pair of rollers 122a,b rotate the container 118 while the carriage 106 moves along the set of tracks 104a,b. By reducing such slipping, the coating 128 may reduce the likelihood that the container 118 may slip axially from the carriage 106 and become damaged and/or damage other equipment. Further or instead, the coating 128 may reduce the likelihood of circumferential slipping between the container 118 and the pair of rollers 122a,b that may inadvertently interrupt tumbling of the contents of the container 118 as the carriage 106. As an example, the coating 128 may include an adhesive-like tacky substance that can withstand the heating environment in the oven 102 while providing a coefficient of friction on the order of 1. Silicone rubber is another example of a tacky substance useable for the coating 128. While the coating 128 may extend over the entirety of each one of the first roller 122a and the second roller 122b in some cases, it shall be appreciated the coating 128 may be intermittent along one or both of the first roller 122a or the second roller 122b, forming one or more tread-like features for intermittently gripping the outer circumference 124 of the container 118. Additionally, or alternatively, in certain instances the container 118 may include a coating along a least a portion of the outer circumference 124 of the container 118 to reduce slippage between the pair of rollers 122a,b and the container 118.

In certain implementations, the system 100 may include an actuator 130 in mechanical communication with the carriage 106. The actuator 130 may be actuatable to move the carriage 106 along the set of tracks 104a,b as part of any one or more of the various different processes described herein for forming activated aluminum in situ within the container 118. As an example, the actuator 130 may be actuatable to rotate at least one of the first roller 122a or the second roller 122b. Additionally, or alternatively, the actuator 130 may push and/or pull the linkage 120 such that the pair of rollers 122a,b are passively driven as the carriage 106 moves through the volume 107 along the set of tracks 104a,b. The actuator 130 may include, for example, an electric motor, a linear actuator, or a combination thereof.

In certain implementations, multiple instances of the carriage 106 may be ganged together to facilitate moving multiple instances of the kit 112 through the oven 102 to achieve high throughput. As an example, multiple instances of the carriage 106 may be ganged together by a connector 132 extending between two adjacent instances of the carriage 106. The connector 132 may be, for example, pivotally connected to each instance of the carriage 106 to accommodate differences in positions of the instances of the carriage 106 along different portions of the set of tracks 104a,b in implementations in which at least a portion of the path 109 defined by the tracks 104a,b is nonlinear. It shall be appreciated that any number of instances of the carriage 106 may be connected together using corresponding instances of the connector 132, as necessary or desirable. Further, or instead, it shall be appreciated that multiple instances of the carriage 106 may be decoupled from one another, in some implementations, such as may be useful for independently controlling processing of each instance of the kit 112 supported on the respective instance of the carriage 106.

In general, the set of tracks 104a,b may be parallel to one another along the path 109 to facilitate stably supporting the carriage 106 as the carriage 106 moves through the volume 107 of the oven 102, even as such movement of the carriage 106 promotes tumbling and mixing of the contents of the container 118 of the kit 112. That is, the set of tracks 104a,b are generally shaped to remain in contact with the first roller 122a and the second roller 122b throughout movement of the carriage 106 along the path 109 defined by the set of tracks 104a,b. In certain implementations, contact between the set of tracks 104a,b and the pair of rollers 122a,b may be point contact, as may be useful for facilitating moving the carriage 106 onto or off of the set of tracks 104a,b. More generally, however, it shall be appreciated that the set of tracks 104a,b and the pair of rollers 122a,b may be in contact with one another according to any one or more of various different techniques suitable for consistent positioning and movement of the pair of rollers 122a,b along the set of tracks 104a,b, with such techniques including grooved engagement, magnetic engagement, or the like. While the set of tracks 104a,b is described as including two tracks, it shall be appreciated that this is for the sake of efficient description and clear illustration. Thus, unless otherwise specified or made clear from the context, it shall be generally understood that the set of tracks 104a,b may include fewer tracks or more tracks, as may be useful for stably supporting the carriage 106 in a given implementation.

In certain implementations, shape of the set of tracks 104a,b may promote agitating contents of the container 118 of the kit 112 in addition to, or instead of, the tumbling agitation imparted to such contents as the container 118 rotates on the pair of rollers 122a,b. For example, each one of the first track 104a and the second track 104b may include a sinusoidal section, with the term "sinusoidal" used in this context to include a mathematical sinusoidal shape as well as any curvilinear shape including alternating peaks and valleys. Continuing with this example, the sinusoidal section of the first track 104a may be out of phase (e.g., 180 degrees out of phase) with the sinusoidal section of the second track 104b. As the carriage 106 moves along the portions of the set of tracks 104a,b with such out-of-phase sinusoidal sections, rotation of the pair of rollers 122a,b along the set of tracks 104a,b may rotate the container 118 about the longitudinal axis "L" defined by the container 118 (e.g., as described above) while also rotating the container 118 about an axis perpendicular to the longitudinal axis "L" and in the direction of travel of the carriage 106. That is, as the pair of rollers 122*a,b* of the carriage 106 moves over the respective sinusoidal sections of the set of tracks 104*a,b*, the container 118 supported on the pair of rollers 122*a,b* may rotate about two perpendicular axes as the carriage 106 moves along the path 109 defined by the set of tracks 104*a,b*. While movement of the carriage 106 along the set of tracks 104*a,b* has been described as generating agitation through rotation about one or more axes, it shall be appreciated that the agitation through back-and-forth motion along a given axis may be additionally or alternatively possible. Thus, more generally, it shall be understood that movement of the carriage 106 along the set of tracks 104*a,b* may promote mixing of the contents in the container 118 through relative movement of the container 118 with respect to one or more axes, with relative movement including any one or more of roll, pitch, and yaw, alone or in combination with one or more of back-and-forth movement along one or more of x, y, and z axes.

In general, the oven 102 may include any one or more of various different types of ovens heated according to any one or more of various different known techniques, such as through the use of natural gas as one of several examples. The volume 107 defined by the oven 102 may be generally sized to accommodate the container 118 supported on the carriage 106 as the carriage 106 moves along the set of tracks 104*a,b* with some clearance between the oven 102 and any moving parts associated with conveyance of the container 118. Additionally, or alternatively, the size of the volume 107 of the oven 102 may be a function of the desired residence time of the container 118 within the heated environment in the volume 107. In certain implementations, the size of the volume 107 may be sized such that an appropriate residence time of the carriage 106 in the volume 107 is achievable at as the carriage 106 executes a single circuit along the path 109 defined by the set of tracks 104*a,b* in the volume 107. However, given that the average speed of the carriage 106 along the path 109 is also tied to the amount of agitation imparted to the contents of the container 118, it may be desirable to move the carriage 106 along the path 109 at higher speed. To maintain a given residence time of the carriage 106 in the heated environment of the volume 107 of the oven 102 (e.g., as dictated by any one or more of the various different heating protocols described herein), the volume 107 of the oven 102 may be increased in some implementations. Additionally, or alternatively, looping the carriage 106 through the volume 107 of the oven 102, along the path 109, may facilitate decoupling average speed of the carriage 106 along the path 109—and, thus, agitation imparted to the contents of the container 118—from residence time of the contents of the container 118 in the heated environment of the volume 107 of the oven 102. That is, the carriage 106 may be looped through the oven 102 several times at a high average speed to facilitate agitating the contents of the container 118 thoroughly while the cumulative amount of time of the contents of the container 118 a heating protocol associated with producing activated aluminum from the contents of the container 118.

In certain implementations, the oven 102 may be a tunnel oven defining an inlet section 134 and an outlet section 136 such that the path 109 defined by the set of tracks 104*a,b* may be straight from the inlet section 134 to the outlet section 136. Such a straight line may be useful for forming the set of tracks 104*a,b* using off-the-shelf parts, that may be readily sourced in the event of the need to repair or replace such parts. While the oven 102 may be a tunnel oven in certain instances, it shall be appreciated that the oven 102 may have any one or more of various different shapes, as may be suitable for a given footprint and, in some cases, may not have a separate inlet and outlet.

Having described various aspects of hardware of the system 100 useful for in situ formation of activated aluminum in the container 118 that may serve as at least one level of packaging used to ship, handle, and/or store the activated aluminum, attention is now directed to use of the heating and agitation in the oven 102 in the context of an overall method of forming of packaging water-reactive aluminum, with aspects of the overall method including preparation steps carried out in the pre-processing station 110 and aging steps carried out in the post-processing station 111.

In general, the pre-processing station 110 may include one or more of an aluminum source 138, a cold-working apparatus 139, an activation metal source 140, an inert gas source 142, or a sealing apparatus 144. In use, as described in greater detail below, aluminum from the aluminum source 138 may be directed to the cold-working apparatus 139, where the aluminum may be formed into the at least one discrete object 114. A conveyor 145 may be operable to position an instance of the container 118 relative to the cold-working apparatus 139 to receive the at least one discrete object 114. Additionally, or alternatively, the conveyor 145 may move the container 118 relative to the activation metal source 140 to receive the liquid metal alloy 116 into the container 118. Further, or instead, the conveyor 145 may move the container 118 to the inert gas source 142 and the sealing apparatus 144 such that the at least one discrete object 114 and the liquid metal alloy 116 may be sealed with inert gas from the inert gas source 142 to form the kit 112 that may be directed onto the carriage 106 (e.g., with the longitudinal axis "L" of the container 118 parallel to the respective axes of rotation of the pair of rollers 122*a,b*). While the conveyor 145 may facilitate automation of at least a portion of the steps carried out along the pre-processing station 110, it shall be appreciated that movement of the conveyor 145 may be intermittent (e.g., as may be useful for incorporating manual operations). Examples of the conveyor 145 include one or more of a series of wheeled carriages or roller chain onto which the container 118 may be placed to move through the pre-processing station 110.

In general, the container 118 may be any one or more of various different types of shapes supportable on the pair of rollers 122*a,b* and reliably rotatable relative to the pair of rollers 122*a,b* as the pair of rollers 122*a,b* rolls along the set of tracks 104*a,b* to move the carriage 106 moves along the path in the volume 107 of the oven 102. Further, or instead, the container 118 may be sized to hold an amount of activated aluminum suitable for producing a quantity of hydrogen sufficient for supporting a given field application, such as inflating a balloon for weather observation. As a specific example, the container 118 may be a 2-quart container (a typical size of a large mason jar or a stainless-steel jar) holding 4 to 6 pounds (~2-3 kg) of activated aluminum. Smaller jars or containers may also be used, depending on the desired application. Still further or instead, the container 118 may include a lining 146 defining at least a portion of a reservoir 148 into which the at least one discrete object 114 and the liquid metal alloy 116 may be deposited and sealed. The lining 146 may be inert with respect to the at least one discrete object 114 and/or the liquid metal alloy 116 such that the lining 146 does not interfere with the in-situ formation of the aluminum of the at least one discrete object 114 into activated aluminum through exposure, heating, and mixing with the liquid metal alloy 116 in the reservoir 148 according to any one or more of the various different techniques described herein.

In certain implementations, the container 118 may advantageously be any one or more of various different off-the-shelf containers that are readily sourced in large quantities and require little or no specialized handling. For example, the container 118 may be any one or more of various different food-grade containers, which can typically resist corrosion by acidic foods and are capable of withstanding high temperatures associated with sterilization. More specifically, the container 118 may be any one or more of a resealable glass or metal container, a steel container with a pull-tab lid, or other containers commonly used to keep food or other material fresh. Even more specifically, for high production volumes (e.g., on the order of thousands of containers a day), the container 118 may be a conventional coated steel can used in food processing. For example, the container 118 may be a 28 oz steel container commonly used to store wet foods, such as tomatoes and beans, and is sealable with a steel lid, which can be opened with a can-opener. As another example, the container 118 may be a paint-can, which is large and typically has a re-scalable lid. Such a paint-can may be useful for storing more than 28 oz of material (e.g., up to about 10 lbs. of activated aluminum). As yet another non-exclusive example, the container 118 may be a mason jar, given that the glass of such a jar is non-reactive and the lids used for such jars are reusable and operable without the use of tools.

In general, the aluminum source 138 may include any one or more of various different forms of aluminum available in bulk. For example, the aluminum source 138 may include a spool 152 of a wire 154 containing aluminum, which may be a particularly useful form factor for a continuous or otherwise high-volume production implementation. Further, or instead, the wire 154 may be amenable to being cold-worked into a variety of cross-sections depending on the application. As an example, the wire 154 may be aluminum tie-wire (also known as clean aluminum wire, aluminum tie-wire, aluminum electrical conduit wire, or EC wire), which is a commonly available in large quantities. Aluminum tie-wire has high aluminum purity and low quantities of silicon and even lower quantities of trace magnesium, making it an ideal hydrogen generation source for applications in which silane gas (SiH4) byproduct is undesirable (e.g., fuel cell applications). Aluminum tie-wire also has low copper content, which is generally desirable, given that copper can interfere with activating aluminum. Further, aluminum tie-wire is a low-cost source of aluminum, as it is mostly a pure form of aluminum (1350 alloy) and can be purchased in large spools convenient for feeding into production machinery. Given the cost-effectiveness of the treatment techniques described herein as compared to processing techniques such as casting, the resulting cost-savings associated with such an inexpensive source of aluminum may facilitate cost-effective production of activated aluminum useful as a high yield source of hydrogen. Also, aluminum tie wire is typically available in gauges of up to 2 g wire, which is approximately ¼ inch diameter. Thus, if sheared in ¼ inch to ½ inch long segments, the resulting small pellets can be easily moved and transported.

In certain implementations, a cleaning element 156 may be disposed between the aluminum source 138 and the cold-working apparatus 139 to facilitate removing trace lubricant present on the wire 154 from original manufacturing of the wire 154. Such lubricant can retard uptake of the liquid metal alloy 116 by the aluminum alloy present in the at least one discrete object 114 during certain processing techniques described herein. Further, lubricant present on the wire 154 can off-gas sulfur, which may be harmful to fuel cells, to the extent fuel cells form an end-use for a particular application. Accordingly, it is generally useful to remove as much of the lubricant or other contaminants from the wire 154 as possible prior to cold-working the wire 154 in the cold-working apparatus 139. The cleaning element 156 may be, for example, a wiper circumscribing the wire 154. As the wire 154 moves through the wiper, contact or near contact between the wiper and the wire 154 may remove the lubricant present on the outer surface of the wire 154.

The cold-working apparatus 139 may include any one or more of various different types of hardware suitable for cold-working the wire 154 and, ultimately, forming the at least one discrete object 114 containing cold-worked aluminum and in a form factor introducible into the reservoir 148 of the container 118. As used herein, a non-recrystallized grain structure shall be understood to be a physical characteristic of material that has been plastically deformed according to any one or more of various different types of cold-working techniques (such as those described herein) and is alternatively referred to herein as "cold-worked", and has not subsequently been exposed to heat above the recrystallization temperature which would anneal the cold working. In the context of the aluminum alloy the wire 154, plastic deformation that occurs during cold working (e.g., at least about 20 percent plastic strain) the aluminum alloy can advantageously yield more surface cracks and initiation sites on an outer surface of the aluminum alloy, where the one or more activation metals of the liquid metal alloy 116 may diffuse via the addition of energy such as heat and mixing provided as the kit 112 moves through the oven 102 as described herein. Further, the non-recrystallized grain structure of the aluminum alloy yields a greater distribution of dislocations and high-angle grain boundaries within the otherwise regular crystalline structure of the aluminum alloy. Thus, for example, as the one or more activation metals of the liquid metal alloy 116 are heated, the greater distribution of dislocations and high-angle grain boundaries in the aluminum alloy may facilitate penetration of the activation metal into and through the interior of the bulk volume of the aluminum alloy of the at least one discrete object 114 during processing in the oven 102 and during post-processing. The wire 154 processed in the cold-working apparatus 139 may have misaligned grains and, thus, a high energy grain boundary (e.g., greater than about 0.5 $J/m^2$), such as a grain boundary characteristic of cold-worked non-recrystallized aluminum.

As an example, the cold-working apparatus 139 may cold-work the wire 154 using cutting (e.g., shearing) that deforms the aluminum alloy, with the deformation heating the aluminum alloy without recrystallizing the aluminum alloy. Through such cutting, the at least one discrete object 114 formed from cutting the wire 154 may include pellet-like pieces. As a more specific example, at the cold-working apparatus 139, the wire 154 may be cut in equal lengths of about one or two times the diameter of the wire 154 to increase the likelihood of imparting sufficient cold-working to the aluminum alloy in the at least one discrete object 114.

As another example, the cold-working apparatus 139 may be a heading machine that cold-works the wire 154 using a heading process that heats the aluminum alloy of the wire 154, without recrystallizing the aluminum alloy, such that the at least one discrete object 114 includes a plurality of sphere-like shapes similar to ball bearings. While the sphere-like shapes formed using the heading process may have flashing, manufacturing costs may be saved by foregoing removal of such flashing.

The pre-processing station 110 may include, for example, a hopper 158 between the cold-working apparatus 139 and the container 118 to facilitate directing the at least one discrete object 114 from the cold-working apparatus 139 into the container 118 with little or no loss of aluminum alloy and/or little to no damage to the container 118 in the transfer. Further, or instead, the hopper 158 may meter a specific quantity (e.g., mass) of the at least one discrete object 114 into the reservoir 148 of the container 118. Generally, mass of the at least one discrete object 114 may be an approximation of the aluminum alloy moved into the reservoir 148, with small deviations from an exact correspondence attributable to small amounts of trace materials and/or contaminants that may be present in the at least one discrete object 114 in variable quantities.

In certain implementations, the hopper 158 may include a heater 160 positioned to direct heat into the at least one discrete object 114 in the hopper 158. Such heating may provide favorable conditions for the liquid metal alloy 116 to be added to the at least one discrete object 114 to permeate the grain boundaries of aluminum alloy present in the at least one discrete object 114. As an example, the heater 160 may heat the at least one discrete object 114 to a temperature greater than 80° C. and less than 200° C. (e.g., about 120° C.). Hotter temperatures do not greatly aid the process of penetrating the liquid metal alloy 116 into the grain boundaries of the aluminum alloy and may reduce plastic strain in the aluminum alloy, with such a reduction being associated with a decrease in reactivity of the activated aluminum eventually produced.

In general, the activation metal source 140 may be heated to maintain the liquid metal alloy 116 at a temperature at which the liquid metal alloy 116 may flow (e.g., under the force of gravity) from the activation metal source 140 into the reservoir 148 of the container 118. The liquid metal alloy 116 may include any one or more of various different activation metals which, in this context, shall be understood to include any metal that is more noble than aluminum such that aluminum and the more noble metal may form a micro-galvanic cell useful for producing hydrogen as described in greater detail below. For example, the liquid metal alloy 116 may include a gallium-indium eutectic.

The activation metal source 140 may, for example, meter an amount of the liquid metal alloy 116 delivered onto the at least one discrete object 114 in the reservoir 148 or, in some cases, delivered contemporaneously with movement of the at least one discrete object 114 into the reservoir 148 from the hopper 158. Given the significant cost typically associated with the one or more activation metals of the liquid metal alloy 116 coupled with the potential for the one or more activation metals to embrittle other equipment, it shall be appreciated that it is generally desirable to use as little of the liquid metal alloy 116 as required to activate the aluminum alloy of the at least one discrete object 114. For example, using a gallium-indium eutectic, it has been experimentally determined by the applicant that greater than about 1 weight percent and less than about 5 weight percent (e.g., between about 1-2 weight percent) of the weight of the aluminum alloy of the at least one discrete object 114 may be suitable to form activated aluminum having high hydrogen yield (e.g., greater than about 85 percent of theoretical yield). Here again, the weight of the at least one discrete object 114 in the container 118 may be used as proxy for these weight percentages, recognizing that the use of "about" in this context accounts for the possible presence of trace materials and small amounts of impurities. Therefore, in implementations in which the liquid metal alloy 116 is a gallium-indium eutectic, the activation metal source 140 may meter the liquid metal alloy 116 onto the at least one discrete object 114 in the container 118 according to these experimentally determined weight percentages. It shall be appreciated that foregoing percentages may change according to the composition of the liquid metal alloy.

With the liquid metal alloy 116 dispersed onto the at least one discrete object 114 in the reservoir 148 of the container 118, the conveyor 145 may move the container 118 to the inert gas source 142 and the sealing apparatus 144. In certain instances, the inert gas source 142 and the sealing apparatus 144 may be co-located with one another to facilitate introducing an inert gas into the reservoir 148 and placing the lid 150 on the container 118 to seal the reservoir 148 substantially contemporaneously.

The gas delivered by the inert gas source 142 may be any one or more of various different gases that are substantially inert at least with respect to the lining 146 of the container 118, the lid 150, the aluminum alloy of the at least one discrete object 114, and the one or more activation metals of the liquid metal alloy 116. In this context, it shall be appreciated that a substantially inert gas may include a gas that is less reactive (e.g., less oxidizing) than air with respect to the materials in the reservoir 148 such that displacing air with the substantially inert gas in the reservoir 148 may facilitate long-term storage of the materials in the kit 112 for further processing in the oven 102 at a later time and/or long-term storage of activated aluminum in a packaged unit 162 following processing the oven 102. Further, or instead, to facilitate maintaining the one or more substantially inert gases in the environment in the reservoir 148, the one or more substantially inert gases may be denser than air at room temperature (70° C.) and atmospheric pressure at sea-level. Thus, while the gas delivered by the inert gas source 142 may include a noble gas (e.g., argon), it shall be appreciated that one or more gasses delivered by the inert as 142 may include carbon dioxide ($CO_2$), which is inexpensive and readily sourced. Further, or instead, the one or more substantially inert gases delivered by the inert gas source 142 may include a mixture of argon and carbon dioxide, as is often used in metal inert gas (MIG) welding.

The sealing apparatus 144 may be any one or more of various different types of equipment useful for securing the lid 150 to the container 118 and, more specifically, may vary with the type of lid and container combination being used. For example, in instances in which the lid 150 is a screwed onto threads of the container 118 (e.g., such as the case of mason jars), the sealing apparatus 144 may be a screw-capping machine. For other types of lids, the sealing apparatus 144 may include any one or more of various different types of automated sealing machinery used in the food industry, where good sealing is imperative to preserving foods.

Sealing the materials in the reservoir 148 of the container 118 forms the kit 112 that may be moved into the oven 102 for processing. In some instances, the kit 112 may be moved into the oven 102 at or near the time of forming the kit 112 such that the workflow associated with the pre-processing station 110 is continuous or semi-continuous with the processing of the kit 112 in the oven 102. In certain implementations, however, the kit 112 may be stored for a time prior to being introduced into the oven 102 for processing into activated aluminum. Such a segmented workflow may be useful, for example, for facilitating storage and/or transportation requirements associated with the kit 112.

The kit 112 may be loaded onto the carriage 106 automatically from the conveyor 145 or manually. With the carriage 106 supported on the pair of rollers 122*a,b*, the carriage 106 may move through the volume 107 of the oven 102 such that the at least one discrete object 114 and the liquid metal alloy 116 may be agitated (e.g., continuously agitated) while the container 118 is in the heated environment of the volume 107 of the oven 102 for a predetermined period associated with a heating protocol for forming the kit 112 into the packaged unit 162 of activated aluminum.

The heating protocol for forming the kit 112 into the packaged unit 162 may include a combination of time, temperature, and agitation useful for achieving significant penetration of one or more activation metals of the liquid metal alloy 116 along the grain boundaries of the aluminum alloy of the at least one discrete object 114. In general, the kit 112 may be heated in the volume 107 of the oven 102 to a temperature above the melt temperature of the one or more activation metals of the liquid metal alloy 116 and below the recrystallization temperature of the aluminum alloy of the at least one discrete object 114. At temperatures in this range, the one or more activation metals from of the liquid metal alloy 116 may diffuse into the aluminum alloy of the at least one discrete object 114 via surface disruptions along the outer surface of the at least one discrete object 114. In particular, the outer surface of the at least one discrete object 114 may include an aluminum oxide coating that is unreactive with water. The one or more activation metals heated in the reservoir 148 may corrode at least a portion of the aluminum oxide coating along the outer surface of the at least one discrete object 114. Importantly, the one or more activation metals may also diffuse into the aluminum alloy of the at least one discrete object 114 to form activation metal-wetted grain boundaries. Without wishing to be bound by theory, it is believed that this may result in microgalvanic cells formed between the aluminum grains (less noble metal) and the surrounding activation metal (more noble metal). As these cells come into contact with water to complete the circuit, water may be exposed to raw aluminum to produce hydrogen. It shall be appreciated, therefore, that the penetration (e.g., diffusion) of the one or more activation metals of the liquid metal alloy 116 into the aluminum alloy of the at least one discrete object 114 to achieve spatial distribution of the one or more activation metals throughout the volume of the aluminum alloy of the at least one discrete object 114 may be advantageous for achieving a high yield of hydrogen from the amount of aluminum alloy reacted (e.g., greater than about 85 percent of theoretical yield).

While heating protocols may vary according to a variety of parameters, such as the composition of the liquid metal alloy 116. As an example, however, it has been experimentally determined that significant penetration of gallium-indium eutectic into cold-worked aluminum alloy may be achieved by exposing the contents of the container 118 to a heating environment of the volume 107 having an average temperature of greater 70° C. and less than 150° C. (e.g., about 120° C.) for greater than 60 minutes and less than 120 minutes (e.g., 90 minutes). As may be appreciated from this example, a heating and agitation protocol may be carried out by setting the oven 102 to a predetermined average temperature within the volume 107 and, once a steady-state heating environment is achieved within the volume 107 of the oven 102, the speed of the carriage 106 moving through the heating environment of the volume 107 may be set to have an average speed corresponding to the predetermined period for activating the aluminum alloy contained within the container 118 and, thus, forming the kit 112 into the packaged unit 162 of activated aluminum. While the average speed may be a single speed in certain implementations, it shall be appreciated that the instantaneous speed may be varied along the path 109 as may be useful or desirable. While it may be possible to pause movement of the carriage 106 along the path 109 such that the instantaneous speed of movement of the carriage 106 may decrease to zero at certain points along the path 109, it shall be appreciated that such pausing also pauses agitation of the contents in the container 118 supported on the pair of rollers 122*a,b*. Accordingly, in some implementations, it may be desirable to maintain an instantaneous speed of the carriage 106 above zero at all times during movement of the carriage 106 through the volume 107 along the path 109.

Following exposure of the kit 112 to a heating and agitating protocol in the oven 102 to form the packaged unit 162 of activated aluminum, the packaged unit 162 may be moved from the oven 102 to the post-processing station 111. At the post-processing station 111, the packaged unit 162 may be inspected for defects. In instances in which the lid 150 is screwed onto the container 118, the lid 150 may be tightened further to seal against moisture ingress into the packaged unit 162. Further, or instead, the packaged unit 162 may be aged until a minimum desired reactivity level is achieved (e.g., typically 2-5 days). Additionally, or alternatively, at least a portion of the aging time for the packaged unit 162 may include transport of the packaged unit 162 to an end-user. Instances in which such transport may take 3-5 days, it shall be appreciated that the packaged unit 162 may be shipped to the end-user soon after being removed from the oven 102. Continuing with this example, by the time the packaged unit 162 reaches the end-user, the packaged unit 162 will be sufficiently aged and ready for use.

In certain implementations, the system 100 may additionally, or alternatively, include a controller 164 in electrical communication with one or more of the oven 102, the heater 126, actuator 130, the aluminum source 138, the cold-working apparatus 139, the activation metal source 140, the sealing apparatus 144, the conveyor 145, the hopper 158, or the heater 160. For example, the controller 164 may include a processing unit 165 and non-transitory, computer-readable storage media 166. Unless otherwise specified or made clear from the context, the non-transitory, computer-readable storage media 166 may have stored thereon instructions for causing the processing unit 165 to cause one or more of the oven 102, the heater 126, actuator 130, the aluminum source 138, the cold-working apparatus 139, the activation metal source 140, the sealing apparatus 144, the conveyor 145, the hopper 158, or the heater 160 to carry out any one or more aspects of the techniques described herein, such as may be useful for high throughput operation of the system 100. Further, or instead, it shall be appreciated that while the controller 164 is shown as a single controller, this is for the sake of clarity of illustration. Thus, unless a contrary intent is explicitly indicated, any one or more of various different aspects of control of one or more of the oven 102, the heater 126, actuator 130, the aluminum source 138, the cold-working apparatus 139, the activation metal source 140, the sealing apparatus 144, the conveyor 145, the hopper 158, or the heater 160 may be distributed, such as may be useful for controlling various components of the system 100 individually.

As one of many examples, the actuator 130 may be in electrical communication with the controller 164, and the computer-readable storage media 166 of the controller 164 have stored thereon computer-executable instructions for causing the processing unit 165 to send a signal to the actuator 130 to control movement of the carriage 106 along the set of tracks 104*a,b*. For example, the signal to the actuator 130 from the controller 164 may correspond to movement of the carriage along the path at a time-averaged rotational speed of the pair of rollers 122*a,b* (operating at the same rotational speed) corresponding to a predetermined period of the carriage within the volume.

While certain aspects of devices, systems, and methods for packaging activated aluminum have been described, other implementations are additionally or alternatively possible.

Figure 2:
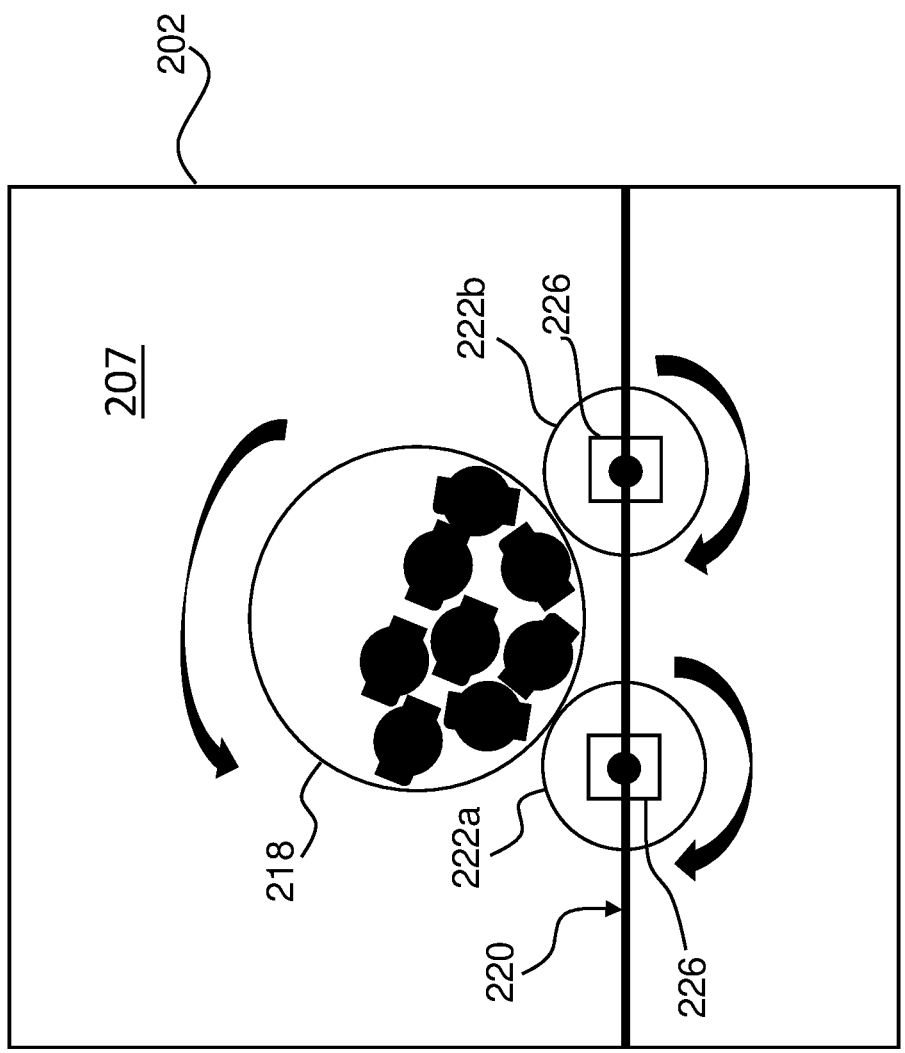
FIG. 2 is a schematic representation of an oven including a pair of rollers rotatable to agitate a container during a batch process.

As an example, while processing of a kit to form a packaged unit of activated aluminum has been described as being carried out using movement of a carriage along a path in an oven, it shall be appreciated that a kit may be processed into a packaged unit of activated aluminum in a batch process carried out in an oven. For example, referring now to FIG. 2, a pair of rollers 222*a,b* may be disposed in a volume 207 defined by an oven 202. For the sake of clear and efficient description, 100-series elements described above and having the same last two digits as 200-series element numbers in the portion of the description that follows shall be understood to be analogous to or interchangeable with one another, unless otherwise explicitly made clear from the context, and, therefore, are not described separately from one another, except to note differences or to emphasize certain features.

The pair of rollers 222*a,b* may be supported on a linkage 220 such that the pair of rollers 222*a,b* may rotate relative to the linkage 220. In turn, the linkage 220 may be fixed in place relative to the volume 207 of the oven 202. A container 218 may be supported on the pair of rollers 222*a,b*, and an actuator 230 may actuate one or both of the pair of rollers 222*a,b* such that the pair of rollers 222*a,b* rotate relative to one another and, in doing so, rotate the container 218 supported on the pair of rollers 222*a,b* to agitate contents of the container 218 while the contents of the container 218 are exposed to a heating environment in the volume 207. Thus, for example, the volume 207 of the oven 202 may be an enclosed volume, such as may be useful for batch processing to facilitate tight control over the heating protocol.

Additionally, or alternatively, one or both of the pair of rollers 222*a,b* may include a heater 226 operable to direct heat into the container 218 from the pair of rollers 222*a,b* as the container 218 is supported and rotates on the pair of rollers 222*a,b*. The heat from the heater 226 may supplement the heat directed into to the container 218 from the oven 202 in some instances. In other implementations, however, the heater 226 directing heat from the pair of rollers 222*a,b* into the container 218 may be the only source of heat in some implementations, as may be useful in implementations in which access to an appropriate oven is limited.

Figure 3B:
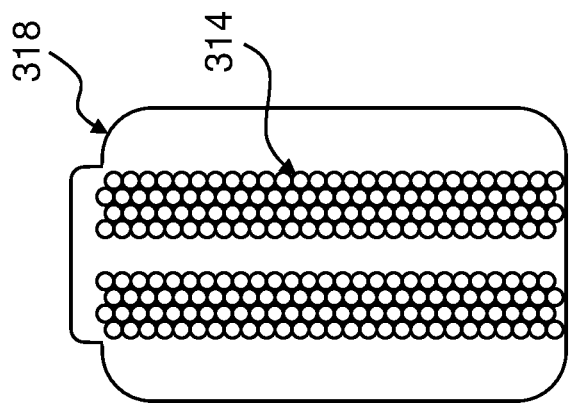
FIG. 3B is a schematic representation of the coil of FIG. 3A positioned in a container.
Figure 3A:
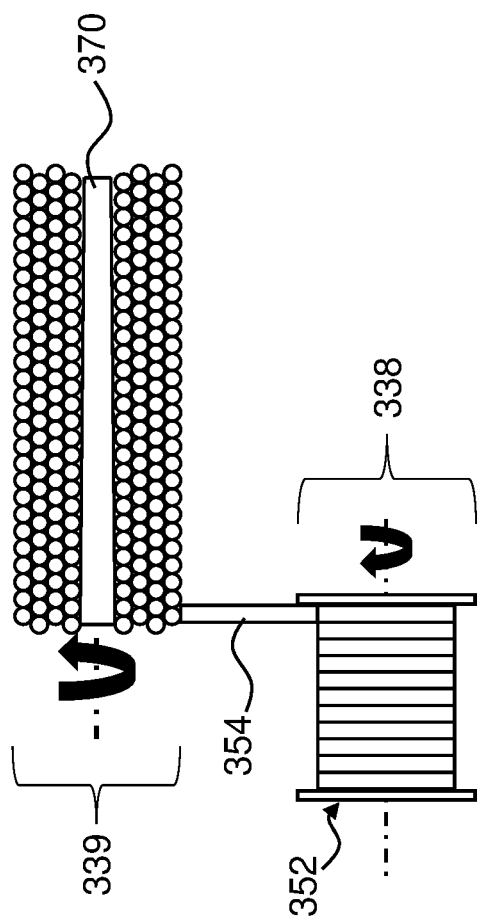
FIG. 3A is a schematic representation of a cold-working section of a system including a mandrel for forming a coil from a spool of wire.

As another example, while certain types of cold-working have been described with respect to plastically deforming an aluminum alloy below a recrystallization temperature of the aluminum alloy, other cold-working techniques are additionally, or alternatively possible, for example, referring now to FIGS. 3A and 3B, an aluminum source 338 may include a spool 352 of a wire 354 of aluminum-containing material, and a cold-working apparatus 339 may include a mandrel 370. For the sake of clear and efficient description, 100-series elements described above and having the same last two digits as 300-series element numbers in the portion of the description that follows shall be understood to be analogous to or interchangeable with one another, unless otherwise explicitly made clear from the context, and, therefore, are not described separately from one another, except to note differences or to emphasize certain features.

In use, the mandrel 370 may spin to uncoil a portion of the wire 354 from the spool 352 and wrap the portion of the wire 354 about the mandrel 370. This process of unwrapping the portion of the wire 354 from the spool 352 and re-wrapping the portion of the wire 354 about the mandrel 370 may cold-work the aluminum alloy in the portion of the wire 354 to facilitate achieving penetration of a liquid metal alloy into the grain structure of the aluminum alloy. That is, the portion of the wire 354 about the mandrel 370 may form at least one discrete object 314 in a coil shape that may be placed into a container 318 and processed according to any one or more of the various different techniques described herein to form a packaged unit of activated aluminum.

Figure 4:
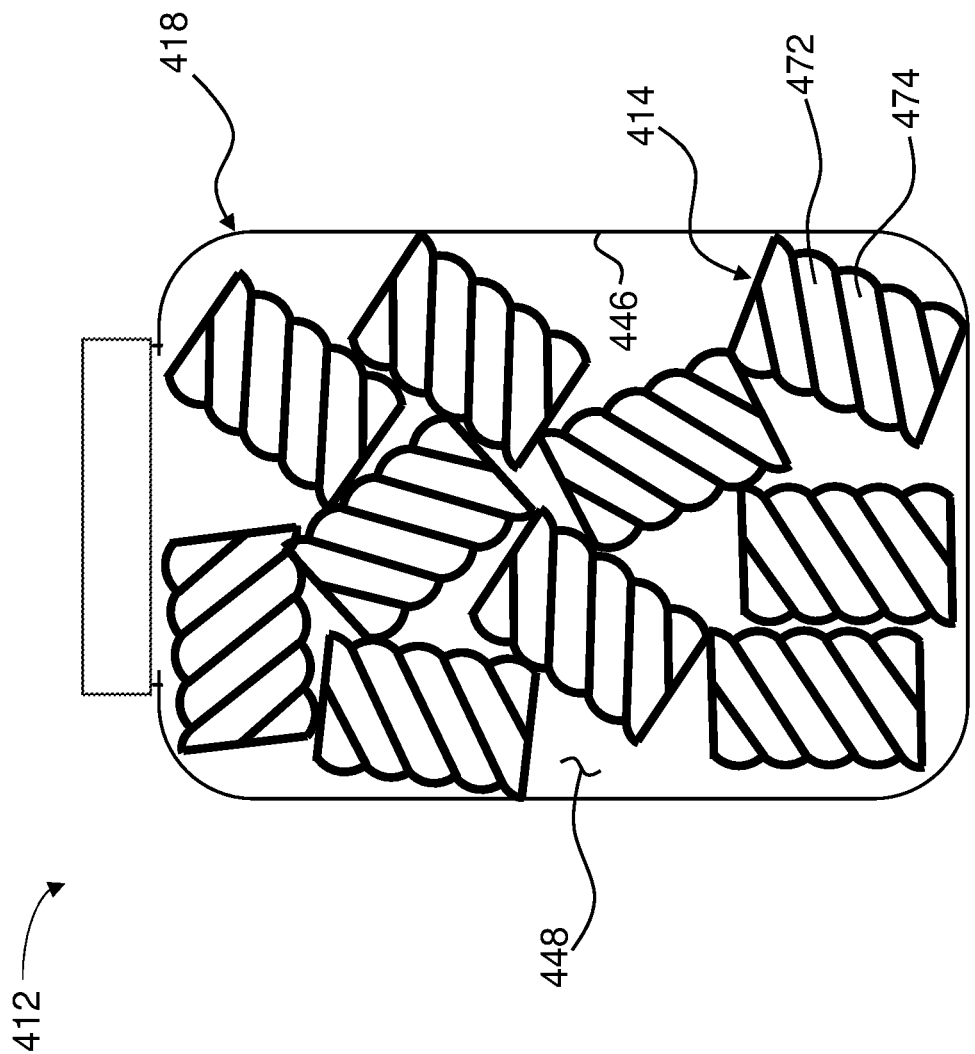
FIG. 4 is a schematic representation of a kit treatable to form a packaged unit of water-reactive aluminum.

As another example, while kits have been described as including a liquid metal alloy and at least one discrete object containing an aluminum alloy, other types of kits are additionally or alternatively possible. For example, referring now to FIG. 4, a kit 412 may include a combination of aluminum alloy and one or more activation metals that are stable over long periods of time to facilitate storing the kit 412 for extended periods prior to treating the kit 412 to form a packaged unit of water-reactive aluminum. For the sake of clear and efficient description, 100-series elements described above and having the same last two digits as 400-series element numbers in the portion of the description that follows shall be understood to be analogous to or interchangeable with one another, unless otherwise explicitly made clear from the context, and, therefore, are not described separately from one another, except to note differences or to emphasize certain features.

The kit 412 may include a container 418 and at least one discrete object 414. The container 418 may include a lining 446 defining at least a portion of a reservoir 448. The at least one discrete object 414 may include an aluminum alloy 472 and one or more activation metals 474. More specifically, the aluminum alloy 472 and the one or more activation metals 474 may each be plastically deformed and non-recrystallized—that is, cold-worked—in the at least one discrete object 414. The at least one discrete object 414 may be inert with respect to the lining 446 of the container 418. Additionally, or alternatively, the environment in the reservoir 448 may include one or more gases inert with respect to the aluminum alloy and the one or more activation metals of the at least one discrete object 414. In some instances, air may be a suitable inert gas in this context, given that the amount of oxygen present to foul the aluminum alloy 472 and/or the one or more activation metals 474 of the at least one discrete object 414 may be insignificant once the container 418 is sealed. Further, or instead, the one or more gases in the reservoir 448 may be denser than air at room temperature (70° C.) and at atmospheric pressure at sea-level to reduce the likelihood that the inert gases will escape from the reservoir 448. Thus, more generally, the aluminum alloy 472 and the one or more activation metals 474 kit 412 that are cold-worked together in the at least one discrete object 414 may be stable over a long period of time, as compared to the stability of aluminum alloy in the presence of a liquid metal alloy of one or more activation metals.

In use at or near a destination associated with end-use of activated aluminum to produce hydrogen, the container of 418 of the kit 412 may be heated (e.g., to a temperature greater than 50° C. and less than 130° C., such as 100° C.) for a short duration (e.g., at least 3 minutes and less than 300 minutes). After this heating protocol has been applied to the at least one discrete object 414 in the container 418, the kit 412 may then be set to age for at least 12 hours a temperature greater than or equal to 20° C. and less than or equal to 50°

C. For example, the kit 412 may be aged at room temperature or in an oven at a temperature slightly elevated above room temperature, but less than 50° C. To facilitate aging the kit 412 in colder environments (e.g., in freezing conditions), it shall be appreciated the kit 412 may be at least partially wrapped in insulation to achieve appropriate aging temperatures. Following such aging, the at least one discrete object 414 may be combined with water to produce hydrogen. As may be appreciated from this example, therefore, the kit 412 may be field processable, which may have significant advantages with respect to logistics of handling and transporting these materials to remote areas.

In general, the aluminum alloy 472 and the activation metal 474 may be cold-worked together according to any one or more of various techniques of cold working described herein. Further, or instead, the aluminum alloy 472 and the activation metal 474 may be cold-worked together according to any one or more of the various different techniques described in U.S. patent application Ser. No. 17/118,335, filed Dec. 10, 2020, and entitled ACTIVATED ALUMINUM FORMATION, the entire contents of which are hereby incorporated herein by reference.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X. Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system comprising:
   a heating environment defining a volume;
   a pair of rollers disposed in the volume, at least one roller of the pair of rollers actuatable to rotate a container on the pair of rollers;
   a heater operable to direct heat into the container, via one or more rollers of the pair of rollers, as the container rotates on the pair of rollers; and
   a controller in electrical communication with the at least one roller and with the heater, the controller configured to actuate the at least one roller according to a speed and a time of a predetermined heating protocol and to control the heater according to a temperature and the time of the predetermined heating protocol.

2. The system of claim 1, wherein the at least one roller of the pair of rollers is actuatable to rotate the container back and forth on the pair of rollers.

3. The system of claim 1, wherein one or both rollers of the pair of rollers includes a coating, and the coating increases a coefficient of friction between the respective one or both of the pair of rollers and the container.

4. The system of claim 3, wherein the coating includes a polymer.

5. The system of claim 4, wherein the coating includes silicone rubber.

6. The system of claim 3, wherein the coating is intermittent along the one or both of the pair of rollers.

7. The system of claim 1, wherein the volume defined by the heating environment is enclosed with access for the container to enter the volume.

8. The system of claim 1, further including a set of tracks, wherein the pair of rollers are positionable along the set of tracks with the container supported on the pair of rollers, and the pair of rollers is movable along the set of tracks while the container is rotated on the pair of rollers away from the set of tracks.

9. The system of claim 8, wherein each track includes a sinusoidal section out of phase with a respective sinusoidal section of the other one of the set of tracks, and the pair of rollers are movable over respective sinusoidal sections of the set of tracks to rotate the container about two perpendicular axes as the pair of rollers moves along the set of tracks.

10. The system of claim 1, wherein the heating environment is an oven in electrical communication with the controller, the oven controllable to heat the volume to a predetermined temperature.

* * * * *